US012623639B2

(12) United States Patent
Joo et al.

(10) Patent No.: US 12,623,639 B2
(45) Date of Patent: May 12, 2026

(54) ELECTRONIC BRAKE SYSTEM AND CONTROL METHOD THEREFOR

(71) Applicant: HL MANDO CORPORATION, Gyeonggi-do (KR)

(72) Inventors: Kyoungjin Joo, Gyeonggi-do (KR); Jinkuk Park, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 359 days.

(21) Appl. No.: 17/794,615

(22) PCT Filed: Jan. 22, 2021

(86) PCT No.: PCT/KR2021/000905
§ 371 (c)(1),
(2) Date: Jul. 22, 2022

(87) PCT Pub. No.: WO2021/150058
PCT Pub. Date: Jul. 29, 2021

(65) Prior Publication Data
US 2023/0061412 A1      Mar. 2, 2023

(30) Foreign Application Priority Data

Jan. 23, 2020      (KR) ........................ 10-2020-0009190

(51) Int. Cl.
*B60T 7/04*          (2006.01)
*B60Q 9/00*          (2006.01)
(Continued)

(52) U.S. Cl.
CPC ................ *B60T 7/042* (2013.01); *B60Q 9/00* (2013.01); *B60T 8/176* (2013.01); *B60T 13/74* (2013.01);
(Continued)

(58) Field of Classification Search
CPC .......... B60T 7/042; B60T 8/176; B60T 13/74; B60T 2270/10; B60T 2270/82;
(Continued)

(56) References Cited

U.S. PATENT DOCUMENTS

2004/0046652 A1*   3/2004   Yokoyama .............. B60T 13/66
                                                                    340/453
2011/0115282 A1*   5/2011   Dinkel .................. B60T 13/143
                                                                    303/3
(Continued)

FOREIGN PATENT DOCUMENTS

DE          19753786          6/1999
DE          102017212366 A1 *   1/2019
(Continued)

OTHER PUBLICATIONS

EPO machine translated description of JP2010089599A. (Year: 2010).*
(Continued)

*Primary Examiner* — Navid Z. Mehdizadeh
*Assistant Examiner* — Shelley Marie Osterhout
(74) *Attorney, Agent, or Firm* — WOMBLE BOND DICKINSON (US) LLP

(57) ABSTRACT

An electronic brake system includes: a master cylinder connected to a brake pedal; a hydraulic pressure supply device including a motor that generates a rotational force and a hydraulic piston movably accommodated in a pressure chamber, and configured to generate a hydraulic pressure by a movement of the hydraulic piston; a hydraulic control unit configured to control a flow of the hydraulic pressure transferred to a wheel cylinder from the hydraulic pressure supply device; a hydraulic block in which the master cylinder, the hydraulic pressure supply device and the hydraulic control unit are integrated; and a controller configured to (Continued)

70 control the motor and the hydraulic control unit, wherein, during an anti-lock braking system (ABS) operation, the controller is configured to generate vibration in the motor by supplying the motor with an excitation current for exciting the motor to notify a driver of the ABS operation by vibration of the brake pedal.

16 Claims, 10 Drawing Sheets

(51) Int. Cl.

| | |
|---|---|
| *B60T 8/176* | (2006.01) |
| *B60T 13/74* | (2006.01) |
| *B60W 50/16* | (2020.01) |
| *H02P 21/22* | (2016.01) |
| *H02P 27/06* | (2006.01) |

(52) U.S. Cl.
CPC ............. *B60W 50/16* (2013.01); *H02P 21/22* (2016.02); *H02P 27/06* (2013.01); *B60T 2270/10* (2013.01); *B60T 2270/82* (2013.01); *B60T 2270/84* (2013.01); *B60Y 2400/81* (2013.01)

(58) Field of Classification Search
CPC .. B60T 2270/84; B60T 8/1701; B60T 13/166; B60T 17/22; B60T 13/745; B60Q 9/00; B60W 50/16; H02P 21/22; H02P 27/06; B60Y 2400/81; G05G 1/46
See application file for complete search history.

(56) References Cited

U.S. PATENT DOCUMENTS

| | | | |
|---|---|---|---|
| 2018/0229702 A1* | 8/2018 | Son | B60T 8/4081 |
| 2019/0233048 A1 | 8/2019 | Takayama et al. | |

FOREIGN PATENT DOCUMENTS

| | | | |
|---|---|---|---|
| JP | H1010963 A | * | 1/1998 |
| JP | 2010089599 A | * | 4/2010 |
| JP | 2015013523 A | * | 1/2015 |
| JP | 2019-201536 | | 11/2019 |
| KR | 10-2011-0036109 | | 4/2011 |
| KR | 10-2018-0094494 | | 8/2018 |
| WO | 2017/098419 | | 6/2017 |

OTHER PUBLICATIONS

EPO machine translated description of reference JPH1010963. (Year: 1998).*
EPO machine translated description of JP2015013523A. (Year: 2015).*
EPO machine translated description of the DE-102017212366-A1 reference. (Year: 2017).*
International Search Report for PCT/KR2021/000905 mailed on Apr. 30, 2021 and its English Machine Translation by Google Translate (now published as WO 2021/150058).
Written Opinion of the International Searching Authority for PCT/KR2021/000905 mailed on Apr. 30, 2021 and its English Machine Translation by Google Translate (now published as WO 2021/150058).
Extended European Search Report dated Jun. 28, 2023 for European Patent Application No. 21743675.7.

* cited by examiner

ELECTRONIC BRAKE SYSTEM AND CONTROL METHOD THEREFOR

CROSS-REFERENCE TO RELATED APPLICATIONS

This application is the U.S. National Stage of International Patent Application No. PCT/KR2021/000905 filed on Jan. 22, 2021, which claims the priority to Korean Patent Application No. 10-2020-0009190 filed in the Korean Intellectual Property Office on Jan. 23, 2020, the entire contents of which are incorporated herein by reference.

TECHNICAL FIELD

The disclosure relates to an electronic brake system that generates a braking force according to an electrical signal corresponding to a displacement of a brake pedal and a control method thereof.

BACKGROUND ART

As part of the preparation for emergency braking, autonomous driving and ongoing demand for eco-friendly technology and safety, the development of a brake-by-wire system that replaces mechanical connections among components of a master cylinder, a booster, an anti-lock braking system (ABS)/electronic stability control (ESC) with electrical and electronic connections is rapidly in progress. In particular, a demand for an integrated electronic brake system that integrates a master cylinder and an actuator into a single block to reduce engine load, reduce weight and allow more design flexibility is increasing.

Unlike an existing brake system, when ABS is activated, because a direct connection between a master cylinder and a wheel brake is disconnected in the integrated electronic brake system, a driver's brake pedal operation is not directly linked to the wheel brake. Accordingly, a kickback phenomenon where a brake pedal vibration occurs during an ABS operation does not occur, and thus a driver may not recognize whether ABS is operating. Also, since an ABS noise is not loud, the driver may not be aware of whether ABS is operating, causing a difficulty in the driver's defensive driving.

Therefore, in the integrated electronic brake system, a new method is required for allowing a driver to recognize whether ABS is operating during an ABS operation.

DISCLOSURE

Technical Problem

An aspect of the disclosure provides an electronic brake system and a control method thereof that may notify a driver of whether ABS is operating when ABS is activated.

Technical Solution

According to an aspect of the disclosure, there is provided an electronic brake system including: a master cylinder connected to a brake pedal; a hydraulic pressure supply device including a motor that generates a rotational force and a hydraulic piston movably accommodated in a pressure chamber, and configured to generate a hydraulic pressure by a movement of the hydraulic piston; a hydraulic control unit configured to control a flow of the hydraulic pressure transferred to a wheel cylinder from the hydraulic pressure supply device; a hydraulic block in which the master cylinder, the hydraulic pressure supply device and the hydraulic control unit are integrated; and a controller configured to control the motor and the hydraulic control unit, wherein, during an anti-lock braking system (ABS) operation, the controller is configured to generate vibration in the motor by supplying the motor with an excitation current for exciting the motor to notify a driver of the ABS operation by vibration of the brake pedal.

The controller is configured to generate vibration simulating a kickback of the brake pedal in the motor in an ABS operation period.

The controller is configured to periodically repeat an ABS operation notification ON period for which the excitation current is supplied and an ABS operation notification OFF period for which the excitation current is not supplied, in the ABS operation period.

The controller is configured to supply the motor with an excitation current of a frequency which does not overlap an ABS operation frequency band.

The controller is configured to generate the vibration in the motor to generate vibration simulating a kickback of the brake pedal in an ABS operation period and generate an alarm sound due to shaking of a vehicle body.

The controller is configured to supply the motor with an excitation current having a plurality of frequencies different from each other.

The controller is configured to supply the motor with an excitation current in which a first frequency and a second frequency are continuously repeated, to generate an alarm sound where two sounds are repeated.

During the ABS operation, the controller is configured to generate the excitation current by adding an excitation current command for generating the excitation current to a q-axis current command among the q-axis current command and a d-axis current command generated according to a target pressure.

According to another aspect of the disclosure, there is provided a control method of an electronic brake system including a master cylinder connected to a brake pedal; a hydraulic pressure supply device including a motor that generates a rotational force and a hydraulic piston movably accommodated in a pressure chamber, and configured to generate a hydraulic pressure by a movement of the hydraulic piston; a hydraulic control unit configured to control a flow of the hydraulic pressure transferred to a wheel cylinder from the hydraulic pressure supply device; a hydraulic block in which the master cylinder, the hydraulic pressure supply device and the hydraulic control unit are integrated; and a controller configured to control the motor and the hydraulic control unit, the control method including: during an ABS operation, generating vibration in the motor by supplying the motor with an excitation current for exciting the motor to notify a driver of the ABS operation by vibration of the brake pedal.

Vibration simulating a kickback of the brake pedal is caused to be generated in the motor in an ABS operation period An ABS operation notification ON period for which the excitation current is supplied and an ABS operation notification OFF period for which the excitation current is not supplied are periodically repeated in the ABS operation period.

The vibration is caused to be generated in the motor to generate vibration simulating a kickback of the brake pedal in an ABS operation period and generate an alarm sound due to shaking of a vehicle body.

The motor is supplied with an excitation current having a plurality of frequencies different from each other.

The motor is supplied with an excitation current in which a first frequency and a second frequency are continuously repeated, to generate an alarm sound where two sounds are repeated.

Advantageous Effects

According to an aspect of the disclosure, an electronic brake system and a control method thereof can notify a driver of whether ABS is operating when ABS is activated.

BEST MODE OF THE DISCLOSURE

Figure 1:
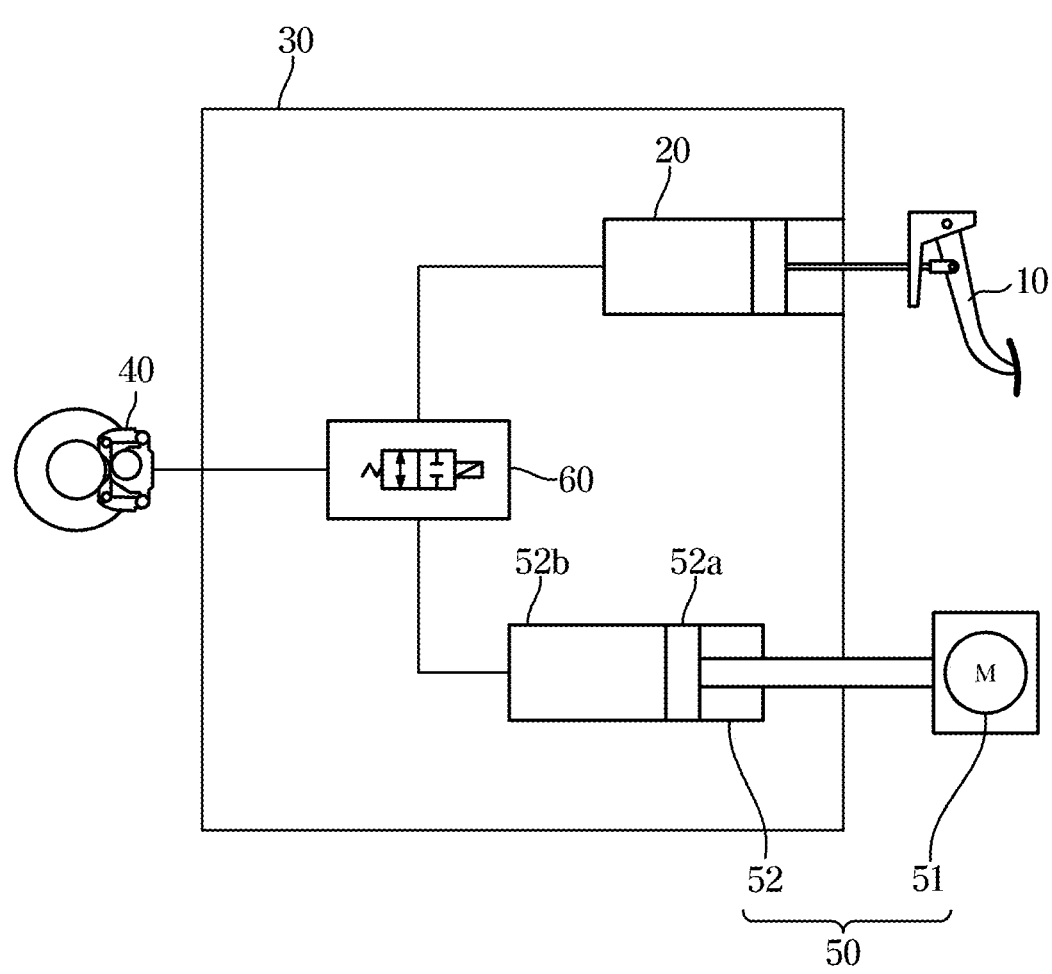
FIG. 1 illustrates a schematic diagram of an electronic brake system according to an embodiment.

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~member", "~module", "~block", and the like may refer to at least one process processed by at least one hardware or software. According to embodiments, a plurality of "~part", "~member", "~module", "~block" may be embodied as a single element, or a single of "~part", "~member", "~module", "~block" may include a plurality of elements.

It will be understood that when an element is referred to as being "connected" to another element, it can be directly or indirectly connected to the other element, wherein the indirect connection includes connection via a wireless communication network.

It will be understood that the term "include" when used in this specification, specifies the presence of stated elements, but do not preclude the presence or addition of one or more other elements.

It will be understood that when it is stated in this specification that a member is located "on" another member, not only a member may be in contact with another member, but also still another member may be present between the two members.

It will be understood that, although the terms first, second, etc. may be used herein to describe various elements, these elements should not be limited by these terms. It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Figure 2:
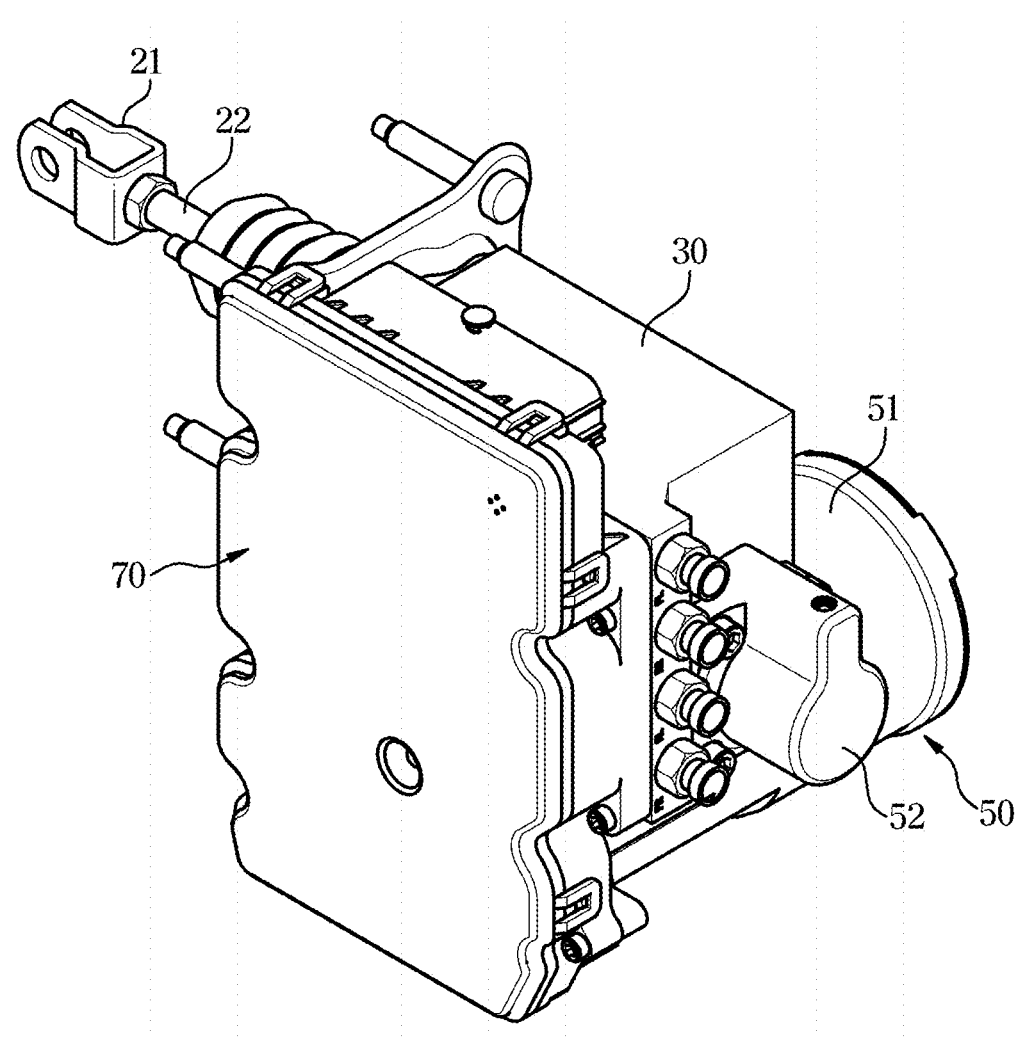
FIG. 2 illustrates a schematic perspective view of an electronic brake system according to an embodiment.

FIG. 1 illustrates a schematic diagram of an electronic brake system according to an embodiment. FIG. 2 illustrates a schematic perspective view of an electronic brake system according to an embodiment.

Referring to FIGS. 1 and 2, the electronic brake system may include a master cylinder 20 which is provided in a hydraulic block 30 and pressurizes and discharges a pressurized medium accommodated therein by an operation of a brake pedal 10, the hydraulic block 30 in which a plurality of flow paths and valves are provided for adjusting a hydraulic pressure therein, a wheel brake 40 coupled to the hydraulic block 30 and provided in each wheel, a hydraulic pressure supply device 50 which is coupled to the hydraulic block 30 and operated by an electrical signal corresponding to a displacement of the brake pedal 10 to generate a hydraulic pressure and supply the generated hydraulic pressure to each of the wheel brakes 40 provided in the respective wheels, a hydraulic control unit 60 that controls a flow of the hydraulic pressure transferred to each of the wheel brakes 40 by the master cylinder 20 or the hydraulic pressure supply device 50, and a control unit or controller (electronic control unit, ECU) 70 that controls the hydraulic pressure supply device 50 and the hydraulic control unit 60 based on hydraulic pressure information and pedal displacement information.

The master cylinder 20 is connected to the brake pedal 10 and includes a master chamber and a master piston pressurized when the brake pedal 10 is depressed, to generate a hydraulic pressure.

The master cylinder 20 may include a clevis 21 coupled to the brake pedal 10 and an input shaft 22 coupled to the clevis 21.

A reservoir for storing oil is coupled to an upper portion of the hydraulic block 30 in which the master cylinder 20 is provided to provide a hydraulic pressure to the master cylinder 20.

The hydraulic block 30 has a hexahedral shape and may function to transfer the hydraulic pressure to the wheel brake 40 provided in each of the wheels.

The hydraulic block 30 may have flow paths formed therein to control the hydraulic pressure transferred to the wheel brake 40, and a plurality of valves may be installed therein.

The master cylinder 20 may be provided inside the hydraulic block 30.

The hydraulic pressure supply device 50 may include a motor 51, coupled to a side surface of the hydraulic block 30, and a slave cylinder 52 pressurized by a power conversion unit which is coupled to the motor 51 and converts a rotational force into a linear motion.

The motor 51 may be a three-phase motor. For example, the motor 51 is a permanent magnet synchronous motor (PMSM). The motor 51 may have a stator and a rotor. The power conversion unit may be provided to have a plurality of gears that receive the rotational force from a rotational shaft of the motor 51 and convert the rotational motion into linear motion. For example, the power conversion unit may have an assembly structure of a worm and worm wheel gear and a rack and pinion gear to convert the rotational force into the linear motion.

The slave cylinder 52 is installed inside the hydraulic block 30, separately from the master cylinder 20, and may include a slave piston 52a, which reciprocates by the rotational force of the motor 51 to generate a hydraulic pressure, and a hydraulic chamber 52b pressurized by the slave piston 52a. In this instance, a rack gear may be formed in a portion of the slave piston 52a to linearly move through the power conversion unit.

The hydraulic pressure supply device 50 may be provided in various manners or structures.

The hydraulic control unit 60 may control the hydraulic pressure transferred to the wheel brake 40 from the master cylinder 20 or the hydraulic pressure supply device 50.

The hydraulic control unit 60 may include an electronically open and closed solenoid valve.

Hereinafter, an anti-lock braking system (ABS) control operation of the electronic brake system including the above-described constituent components is described.

During an ABS operation, the control unit 70 may close a cut valve provided in a flow path between the master cylinder 20 and the wheel brake 40 to prevent a hydraulic pressure discharged from the master cylinder 20 from being transferred to the wheel brake 40.

Also, the controller 40 may operate the hydraulic pressure supply device 50 to generate a hydraulic pressure. For example, by moving the slave piston 52a by an operation of the motor 51 of the hydraulic pressure supply device 50, a hydraulic pressure may be generated in the hydraulic chamber 52b. The hydraulic pressure generated by the hydraulic pressure supply device 50 may be supplied to the wheel brake 40 through the hydraulic control unit 60 to generate a braking force on the wheels. In this instance, the control unit 70 may drive the hydraulic pressure supply device 50 and the hydraulic control unit 60 according to a required ABS target pressure, thereby increasing, decreasing or maintaining a pressure of the wheel brake 40 of each of the wheels.

As described above, in the electronic brake system having the above constituent components, because a direct connection between the master cylinder 20 and the wheel brake 40 is disconnected during an ABS operation, a driver's brake pedal operation is not directly linked to the wheel brake 40. Accordingly, a kickback phenomenon where vibration occurs in the brake pedal 10 during an ABS operation does not occur. In addition, an ABS noise is not loud, and thus a driver may not recognize whether an ABS is operating.

Therefore, a new method for enabling a driver to recognize whether an ABS is operating is required.

The electronic brake system according to an embodiment has a structure in which the motor 51 and the brake pedal 10 are mounted on the same hydraulic block 30, which enables vibration of the motor 51 to be directly transmitted to the brake pedal 10.

Accordingly, the electronic brake system according to an embodiment may generate vibration corresponding to an ABS operation in the motor 51 through control of the motor, thereby enabling the driver to recognize whether the ABS is operating by a vibration pattern transmitted to the brake pedal 10 and an alarm sound generated by the vibration pattern.

Figure 3:
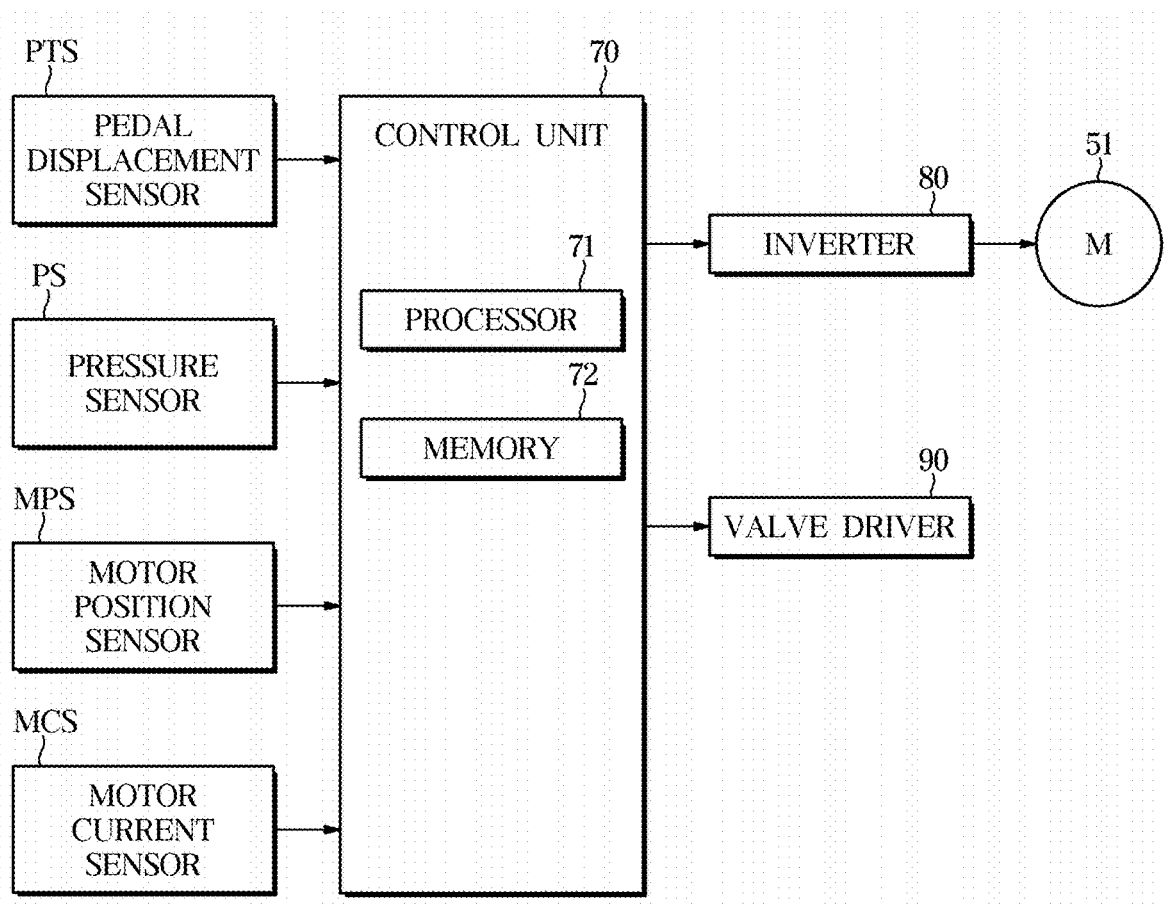
FIG. 3 illustrates a control block of an electronic brake system according to an embodiment.

FIG. 3 illustrates a control block of an electronic brake system according to an embodiment.

Referring to FIG. 3, the electronic brake system may include the control unit 70 that performs overall control.

An inverter 80 and a valve driver 90 may be electrically connected to an output side of the control unit 70.

A pedal displacement sensor (PTS), a pressure sensor (PS), a motor position sensor (MPS), and a motor current sensor (MC S) may be electrically connected to an input side of the control unit 70.

The inverter 80 may drive the motor 51.

The valve driver 90 may drive various types of electromagnetic valves of the electronic brake system.

The valve driver 90 may drive a solenoid valve of the hydraulic control unit 60.

The PTS may detect an operation and a displacement of the brake pedal 10.

The PS may detect a pressure of the wheel brake 40. Also, the PS may detect a hydraulic pressure transferred to the wheel brake 40.

The MPS may detect a rotation position and rotation speed of the motor 51. The MPS may include at least one Hall sensor for detecting a position of a rotor. The Hall sensor is an application of a galvanomagnetic effect called a 'Hall effect'. The Hall effect refers to a generation of electromotive force (Hall voltage) at both ends of a compound semiconductor when a current flows through the compound semiconductor and a magnetic field is applied at a right angle. When measuring a Hall voltage using the above phenomenon, whether an applied magnetic field is N-pole or S-pole may be identified. The Hall sensor may detect a change in pole of a permanent magnet provided in a rotor using the above principle to identify a position or a speed of the rotor.

The MCS may detect a current flowing in each phase of the motor 51. For example, the MCS may include a first current sensor for detecting a current flowing in any one phase of three phases of the motor 51 and a second current sensor for detecting a current flowing in any one of the remaining two phases.

Each of the PTS, the PS, the MPS and the MCS may transmit detected information to the control unit 70.

The control unit 70 may be referred to as an electronic control unit (ECU).

The control unit 70 may include a processor 71 and a memory 72.

The memory 72 may temporarily store detection data received from the PTS, the PS, the MPS, and the MCS, and also temporarily store a processing result of the detection data by the processor 71.

The memory 72 may include a volatile memory such as a static random access memory (S-RAM) and dynamic random access memory (D-RAM), and a non-volatile memory such as a flash memory, a read only memory (ROM), an erasable programmable read only memory (EPROM), and the like The processor 71 may drive the motor 51 through the inverter 80 based on various information detected through the PTS, the PS, the MPS, and the MCS, and drive the hydraulic control unit 60 through the valve driver 90.

The processor 71 may drive the motor 51 and the hydraulic control unit 60, thereby generating a hydraulic pressure by a movement of the slave piston 52a. Also, the processor 71 may supply the generated hydraulic pressure to the wheel brake 40 provided in each wheel, thereby braking the wheels.

The processor 71 may determine a target pressure (command pressure) according to a pedal displacement detected through the PTS in a normal braking mode.

The processor 71 may determine a target pressure (command pressure) according to an ABS situation in an ABS mode.

The processor 71 may detect a motor position through the MPS.

The processor 71 may determine the amount of movement of the slave piston 52a from a change in motor position. The amount of movement of the slave piston 52a from an original position to a current position may be determined from the change in motor position.

The processor 71 may determine a pressure by converting the amount of movement of the slave piston 52a into a pressure value. As the slave piston 52a moves forward, a volume of the hydraulic chamber 52b decreases and a pressure may increase. The processor 71 may convert the pressure from the amount of movement of the slave piston 52a in same volume. The opposite is also possible.

The processor 71 may determine a pressure of the wheel brake 40 detected through the PS as a circuit pressure.

In order to generate a hydraulic pressure, in the normal braking mode, the processor 71 may detect a displacement of the brake pedal 10 through the PTS, determine the target pressure based on the detected displacement of the brake pedal 10, set the determined target pressure as a target pressure of the wheel brake 40, detect a pressure of the wheel brake 40 through the PS, and move the slave piston 52a using a rotational force of the motor 51 so that the detected pressure of the wheel brake 40 reaches the set target pressure.

When an ABS control situation occurs in the normal braking mode, the processor 71 may switch the normal braking mode to the ABS mode.

In the ABS mode, the processor 71 may set a target pressure according to the ABS control situation as a target pressure of the wheel brake 40, detect a pressure of the wheel brake 40 through the PS, and operate the motor 51 and the hydraulic control unit 60 so that the detected pressure of the wheel brake 40 reaches the set target pressure.

In the ABS mode, the processor 71 may vibrate the motor 51 by excitation/vibration, thereby transmitting the vibration to the brake pedal 10 to enable the driver to recognize the ABS operation.

In the ABS mode, when driving the motor 51 to generate a hydraulic pressure, the processor 71 may apply a dithering signal to a current command of the motor 51, thereby inducing vibration of the brake pedal 10 through motor excitation/vibration while minimizing an effect of pressure control, to enable the driver to recognize an ABS operation.

When the motor 51 is excited in the ABS mode, the vibration in the motor 51 is transmitted to the brake pedal 10 coupled to the same hydraulic block 30 as the motor 51, and thus vibration simulating a kickback may be generated in the brake pedal 10.

The driver may feel the vibration of the brake pedal 10 and recognize whether ABS is operating.

Figure 4:
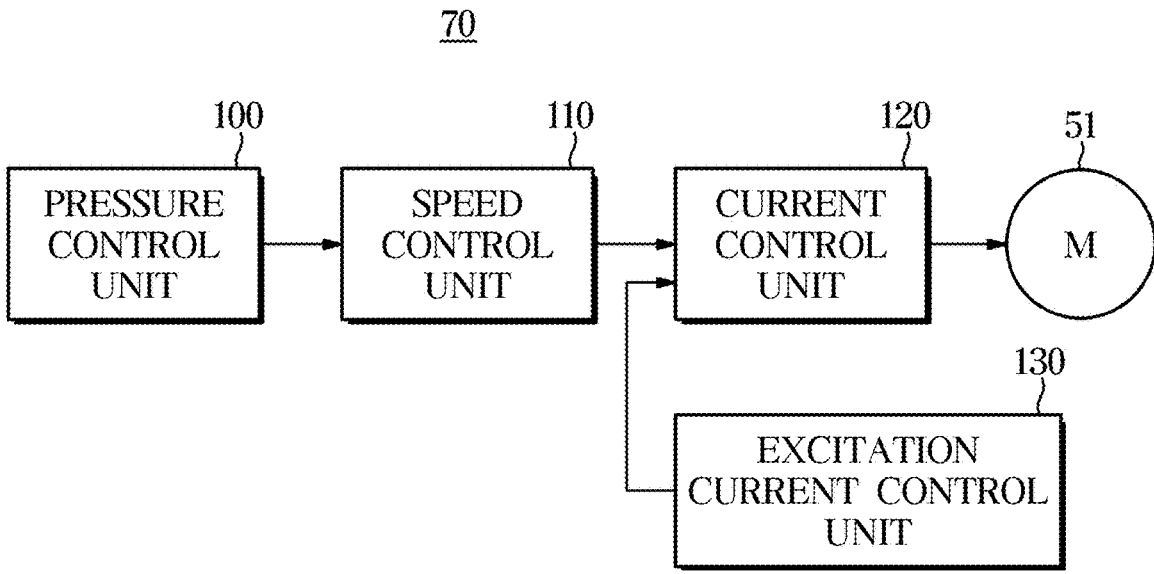
FIG. 4 illustrates a schematic control block of a controller of an electronic brake system according to an embodiment.

FIG. 4 illustrates a schematic control block of a control unit or controller of an electronic brake system according to an embodiment.

Referring to FIG. 4, the control unit or controller 70 may include a pressure control unit 100, a speed control unit 110, a current control unit 120, and an excitation current control unit 130.

The pressure control unit 100 may output a speed command for adjusting a speed of the motor 51 so that an actual pressure of the wheel brake 40 reaches a command pressure.

The pressure control unit 100 may output the speed command to the speed control unit 110.

The speed control unit 110 may output a current command for adjusting a current of the motor 51 so that an actual speed of the motor 51 reaches a command speed.

The speed control unit 110 may output the current command to the current control unit 120.

The current control unit 120 may output a voltage command for adjusting a voltage of the motor 51 so that an actual current of the motor 51 reaches a command current.

The current control unit 120 may output the voltage command to the motor 51 side.

The excitation current control unit 130 may output an excitation current command for exciting the motor 51.

The excitation current control unit 130 may output the excitation current command to the current control unit 120.

Figure 5:
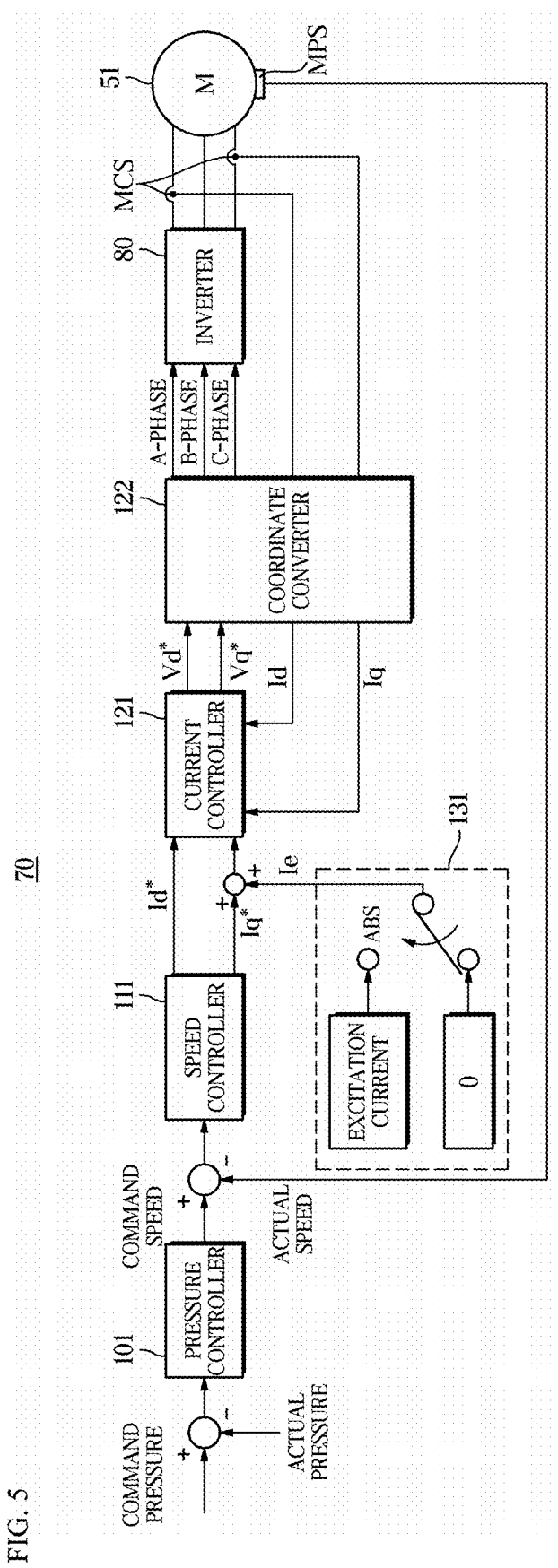
FIG. 5 illustrates a detailed control block of a controller of an electronic brake system according to an embodiment.

FIG. 5 illustrates a detailed control block of a control unit or controller of an electronic brake system according to an embodiment.

Referring to FIG. 5, the pressure control unit 100 may include a pressure controller 101 controlling overall operations of the pressure control unit 100. The speed control unit 110 may include a speed controller 111 controlling overall operations of the speed control unit 110. The current control unit 120 may include a current controller 121/coordinate converter 122 or the current controller 121 controlling overall operations of the current control unit 120. The excitation current control unit 130 may include an excitation current controller 131 controlling overall operations of the excitation current control unit 130.

The motor 51 may be controlled by the inverter 80.

The inverter 80 may be controlled by the current controller 121.

The speed controller 111 may receive a speed command according to a pressure difference between a command pressure and an actual pressure from the pressure controller 101, and provide a current command to the current controller 121.

The current controller 121 may output a three-phase voltage command to the inverter 80, and the inverter 80 may provide the motor 51 with a three-phase current according to the three-phase voltage command.

The MPS may be mounted on the motor 51, and the MPS may detect a speed of a rotor of the motor 51. The detected speed of the rotor may be used for feedback-control in the speed controller 111.

Specifically, the current controller 121 may receive, from the speed controller 111, a d-axis current command Id* and a q-axis current command Iq*, which are current commands Id* and Iq* of a synchronous coordinate system, and transmit voltage commands Vd* and Vq* of the synchronous coordinate system to the coordinate converter 122. The coordinate converter 122 may convert the voltage commands of the synchronous coordinate system into a three-phase voltage command (a-phase, b-phase, and c-phase) and provide to the inverter 80. The inverter 80 may provide the motor 51 with a three-phase current through a duty of pulse width modulation (PWM) of a three-phase switching circuit, based on the received three-phase voltage command (a-phase, b-phase, and c-phase).

Figure 6:
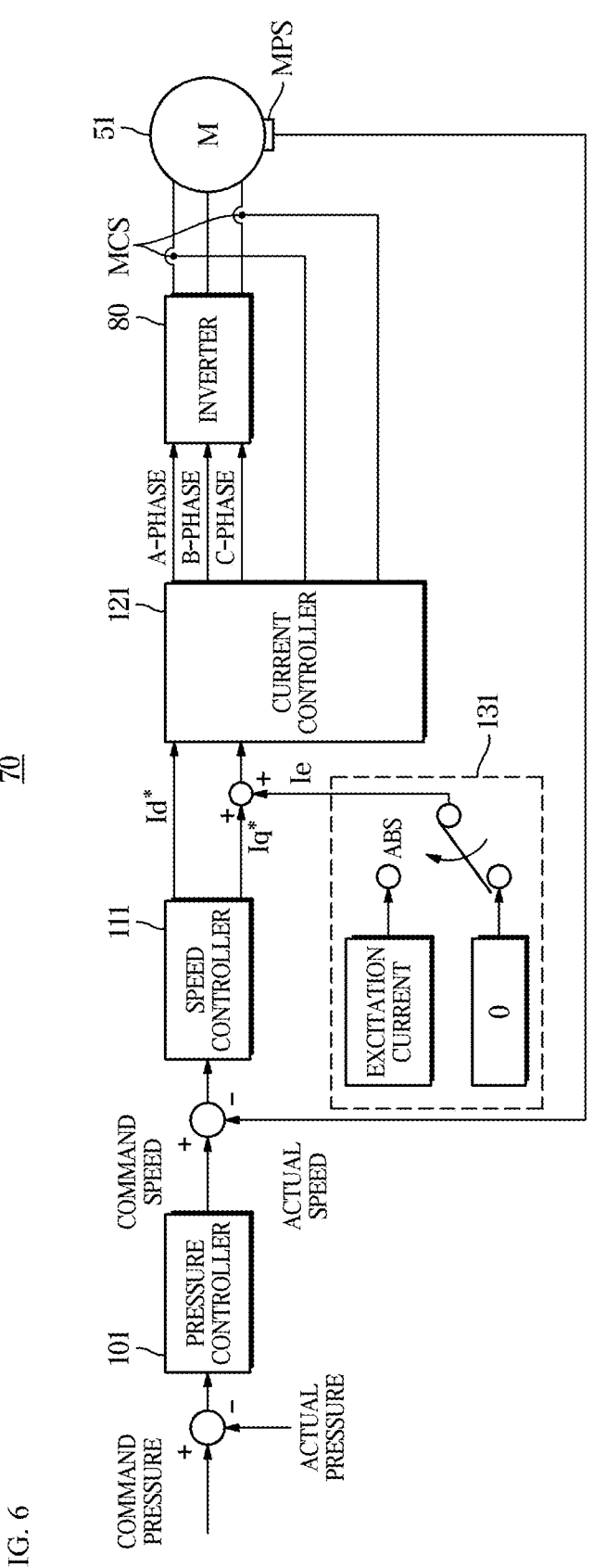
FIG. 6 illustrates another example of a detailed control block of a controller of an electronic brake system according to an embodiment.

The current controller 121 may be implemented as a single current controller by integrating a function of the current controller 121 and a function of the coordinate converter 122. (refer to FIG. 6)

Figure 7:
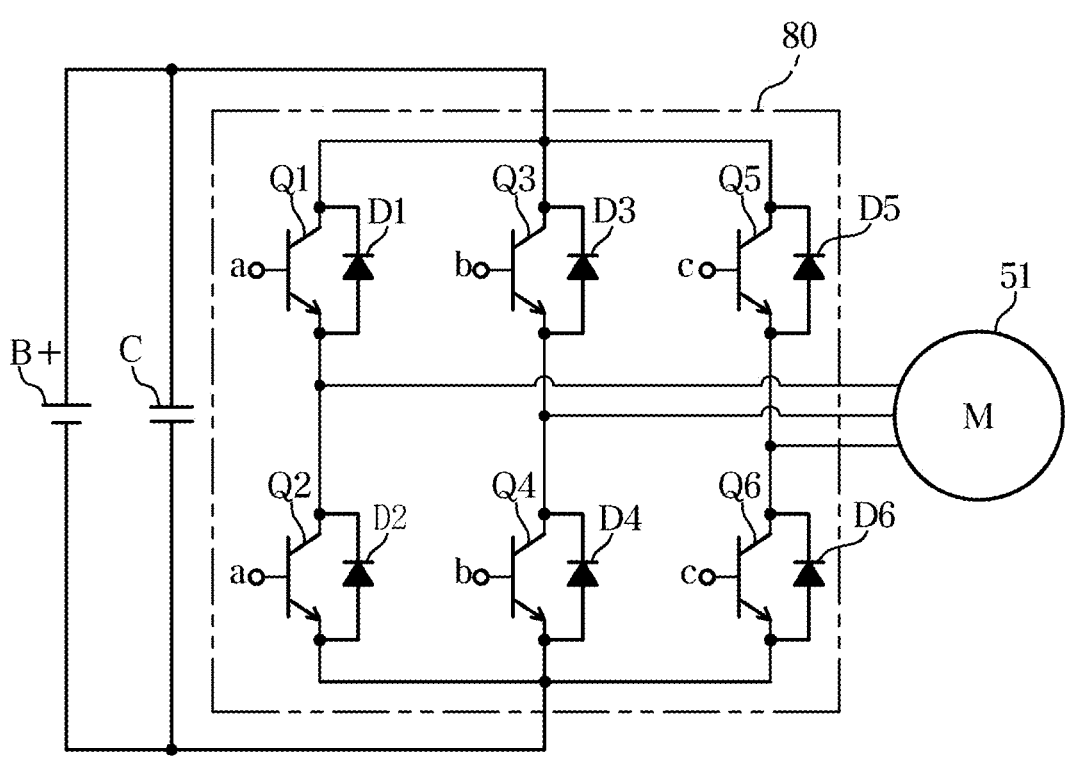
FIG. 7 illustrates a connection between an inverter and a motor of an electronic brake system according to an embodiment.

FIG. 7 illustrates a connection between an inverter and a motor of an electronic brake system according to an embodiment.

Referring to FIG. 7, the inverter 80 may be electrically connected to a vehicle battery B+, which is a direct current (DC) power source, and a DC link capacitor C for smoothing a voltage signal. The DC link capacitor C may be connected in parallel to the vehicle battery B+. The DC link capacitor C may smooth a DC voltage supplied from the vehicle battery B+. The DC voltage smoothed by the DC link capacitor C may be supplied to the inverter 80.

The inverter 80 may drive the motor 51 by converting the DC voltage into a three-phase alternating current (AC) voltage in a form of pulse having an arbitrary variable frequency through a pulse width modulation (PWM). The inverter 80 may include a plurality of power switching devices and a plurality of diodes. For example, the inverter 80 may include six power switching devices Q1 to Q6 and six diodes D1 to D6.

The inverter 80 may turn on or off the power switching devices Q1 to Q6 according to a three-phase voltage command (a-phase, b-phase, and c-phase) provided from the current controller 121, thereby converting the current supplied from the battery B+ from a direct current to an alternating current and supplying to the motor 51. In this instance, the voltage of the battery B+ may be boosted by a converter and supplied to the inverter 80.

Each phase terminal of the motor 51 is connected to the inverter 80.

The motor 51 may have three coils which are an a-phase coil, a b-phase coil, and a c-phase coil. For example, the a-phase coil, the b-phase coil, and the c-phase coil may form a Y configuration. In the motor 51, an alternating current having a phase difference of 120 degrees may be applied to each coil, thereby rotating a rotation shaft of the motor 51.

Referring again to FIGS. 5 and 6, the current controller 121 may apply a voltage command to the inverter 80, so that a measured value of the driving current supplied by the inverter 80 to the motor 51 follows the current command. The MCS for detecting the driving current supplied from the inverter 80 to the motor 51 may be provided between the inverter 80 and the motor 51. The MCS may measure two or more currents among the three-phase driving currents and the currents may be fed back to the current controller 121. The current controller 121 may perform feedback control so that the measured driving current values Id and Iq follow the current commands Id* and Iq* received from the speed controller 111.

Meanwhile, when transmitting the q-axis current command Iq* from the speed controller 111 to the current controller 121, the excitation current controller 131 may transmit to the current controller 121 by adding an excitation current command Ie or 0 to the q-axis current command Iq*. That is, by transmitting the q-axis current command Iq* together with the excitation current command Ie, the motor 51 may be vibrated by the excitation current command Ie transmitted together with the q-axis current command Iq* when driving the motor.

Referring again to FIG. 3, in order for the driver to recognize an ABS operation when the ABS mode is on, the processor 71 may generate vibration to the brake pedal 10 by exciting the motor 51 and generate an alarm sound that the driver may hear by inducing a vehicle shaking due to the vibration of the motor 51. Each of the vibration and the alarm sound may be repeated at a preset pattern.

When driving the motor 51 to generate a hydraulic pressure in the ABS mode, the processor 71 may transmit the current command of the motor 51 together with the excitation current command, thereby generating a specific sound pattern through motor excitation/vibration while minimizing an effect of pressure control to enable the driver to recognize whether ABS is operating through the alarm sound.

Figure 8:
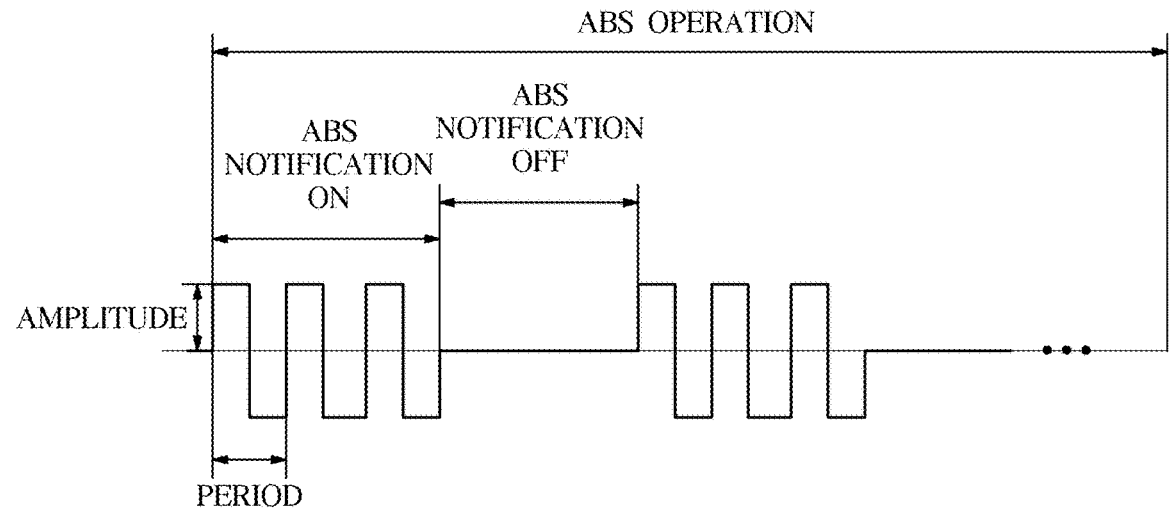
FIG. 8 illustrates an excitation current when an anti-lock braking system (ABS) is operating, in an electronic brake system according to an embodiment.

FIG. 8 illustrates an excitation current when an ABS is operating, in an electronic brake system according to an embodiment.

Referring to FIG. 8, an excitation current command is injected into a q-axis current command Iq* in an ABS notification ON period, but not injected into the q-axis current command Iq* in an ABS notification OFF period, so that a driver may reliably recognize an ABS operation and an ABS release in an ABS operation period.

An excitation current may have a preset amplitude and a preset frequency.

The excitation current may have a frequency which provides '±' to a basic command current for a brake pedal feeling according to an ABS operation.

The frequency of the excitation current may be determined in a region that does not overlap an ABS operation frequency.

The amplitude and a period of the excitation current may vary depending on a capacity and a load size of the motor 51.

The amplitude of the excitation current is provided so that the amount of load entering is the same as the amount of load being subtracted based on a q-axis current, and thus a slight ripple may occur in a speed of the motor. However, pressure fluctuations may be minimized in terms of pressure.

With respect to the amplitude of the excitation current, a total amplitude value may be assigned from 0 to 100 based on 0, or ±50 based on 50. Based on an arbitrary reference value, a specific value determined according to the reference value may be assigned as ±.

For reference, for the amplitude of the excitation current, an amplitude value may be determined in a + direction based on the q-axis current, and may also be determined in a − direction. That is, an amplitude may be given in a single direction.

In addition, a total excitation duty cycle of an excitation current pattern may be adjusted to minimize the effect on the pressure control.

For example, a load may be distributed by applying the excitation current pattern at 25% duty cycle from the total excitation duty cycle.

Also, a load may be distributed by applying the excitation current pattern at 50% duty cycle from the total excitation duty cycle.

As such, at least one of the amplitude or the period of the excitation current may be changed.

As described above, during the ABS operation, by additionally applying the excitation current command to a load current command, vibration is generated in a motor driving pattern and transmitted to the brake pedal, and thus the driver may recognize whether the ABS is operating.

As such, in the ABS mode, by inducing a specific alarm sound through motor excitation/vibration while minimizing an effect of pressure control, the driver may recognize whether the ABS is operating through the alarm sound.

The excitation current may be periodically repeated in the ABS notification ON period and the ABS notification OFF period during the ABS operation period.

The excitation current may be discontinuously repeated in the ABS operation period. In this case, the alarm sound due to the vehicle shaking may be generated together with vibration in the ABS operation period.

Figure 9:
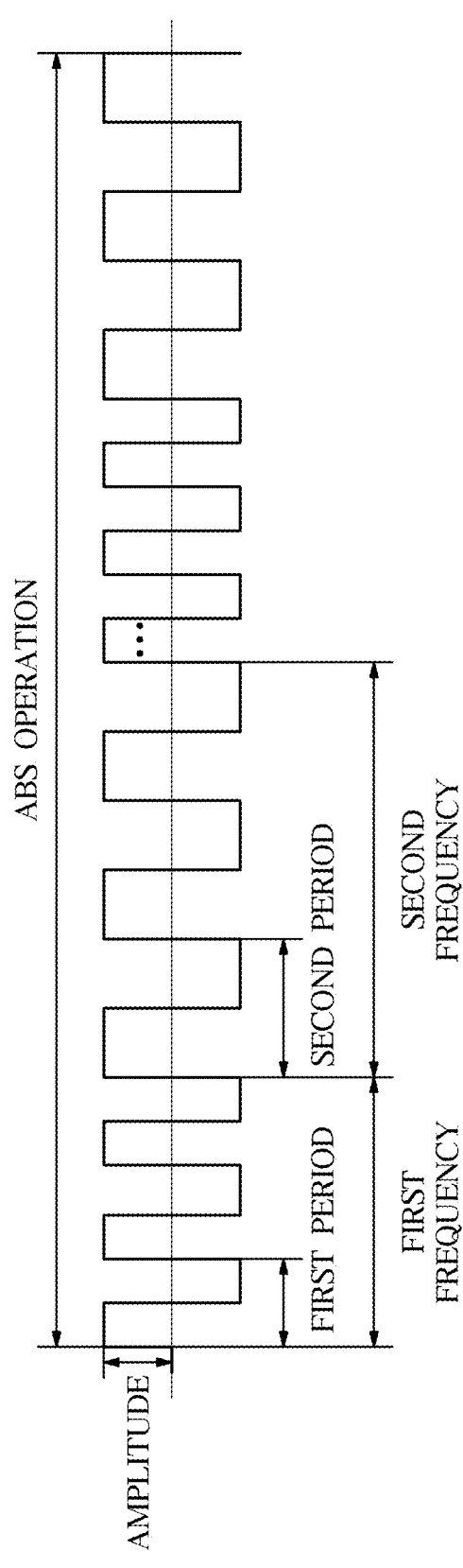
FIG. 9 illustrates another example of excitation current in an electronic brake system according to an embodiment.

FIG. 9 illustrates another example of excitation current in an electronic brake system according to an embodiment.

Referring to FIG. 9, motor vibration and an alarm sound having a specific tone may be generated by varying a vibration period of excitation current in an ABS operation period.

In the ABS operation period, the excitation current may combine two or more different frequencies, not a single frequency.

For example, the excitation current may include a first frequency having a first period and a second frequency having a second period.

The excitation current may continuously repeat the first frequency and the second frequency.

The excitation current may diversify a pattern of the alarm sound by having the first and second frequencies. The motor vibration causes a vehicle shaking according to the two different frequencies, and the vehicle shaking may generate the alarm sound such as a beep sound in which two sounds are repeated. Accordingly, a driver may recognize whether an ABS is operating through the alarm sound together with a brake pedal feeling.

Figure 10:
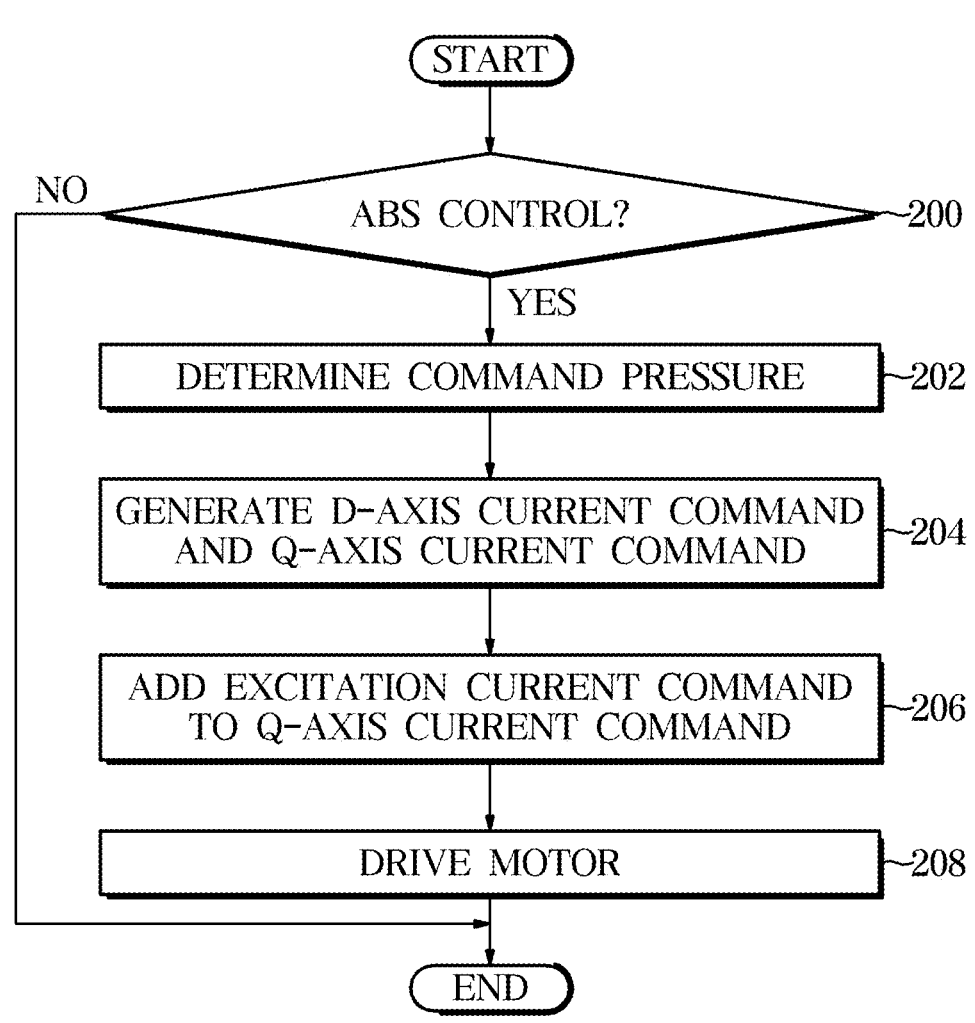
FIG. 10 illustrates a control method of an electronic brake system according to an embodiment.

FIG. 10 illustrates a control method of an electronic brake system according to an embodiment.

Referring to FIG. 10, first, the control unit 70 may determine whether ABS control is required (200).

When it is determined that the ABS control is required as a result of the determination in operation 200, the control unit 70 may determine a command pressure according to an ABS control situation (202).

The control unit 70 may generate a d-axis current command and a q-axis current command according to the determined command pressure (204).

The control unit 70 may add an excitation current command to the q-axis current command (206).

The control unit 70 may drive the motor 51 through the inverter 80 according to the d-axis current command and the q-axis current command to which the excitation current command is added (208). Accordingly, the motor 51 generates vibration by an excitation current added to a command current, and the vibration may be transmitted to the brake pedal 10, thereby generating vibration similar to a kickback phenomenon to the brake pedal 10. Also, due to a change in frequency of excitation current, a vehicle shaking may generate an alarm sound in a form of beep sound. Accordingly, a driver may recognize whether ABS is operating through the vibration of the brake pedal 10 and the alarm sound.

Although it is described in the above-described embodiment that the excitation current command is added to the q-axis current command, the excitation current command may also be added to the d-axis current command.

Meanwhile, the aforementioned control unit and/or its constituent components may include at least one processor/microprocessor(s) combined with a computer-readable recording medium storing a computer-readable code/algorithm/software. The processor/microprocessor(s) may execute the computer-readable code/algorithm/software stored in the computer-readable recording medium to perform the above-described functions, operations, steps, and the like.

The aforementioned controller and/or its constituent components may further include a memory implemented as a non-transitory computer-readable recording medium or transitory computer-readable recording medium. The memory may be controlled by the aforementioned controller and/or its constituent components and configured to store data, transmitted to or received from the aforementioned controller and/or its constituent components, or data processed or to be processed by the aforementioned controller and/or its constituent components.

The disclosed embodiment may be implemented as the computer-readable code/algorithm/software in the computer-readable recording medium. The computer-readable recording medium may be a non-transitory computer-readable recording medium such as a data storage device capable of storing data readable by the processor/microprocessor(s). For example, the computer-readable recording medium may be a hard disk drive (HDD), a solid state drive (SDD), a silicon disk drive (SDD), a read only memory (ROM), a compact disc read only memory (CD-ROM), a magnetic tape, a floppy disk, an optical recording medium, and the like.

The invention claimed is:

1. An electronic brake system, comprising:
a master cylinder connected to a brake pedal;
a hydraulic pressure supply device comprising a motor that generates a rotational force and a hydraulic piston movably accommodated in a pressure chamber, and configured to generate a hydraulic pressure by a movement of the hydraulic piston;
a hydraulic control unit configured to control a flow of the hydraulic pressure transferred to a wheel cylinder from the hydraulic pressure supply device;
a hydraulic block in which the master cylinder, the hydraulic pressure supply device and the hydraulic control unit are integrated; and
a controller configured to control the motor and the hydraulic control unit,
wherein, the controller is configured to, during an anti-lock braking system (ABS) operation, add an excitation current for exciting the motor to a current for controlling a speed of the motor such that the motor is vibrated by the excitation current added to the current for controlling the speed of the motor, and transmit vibration, generated by the motor's being vibrated by the excitation current added to the current for controlling the speed of the motor, to the brake pedal through the hydraulic block in which the motor and the brake pedal are jointly mounted to notify a driver of the ABS operation.

2. The electronic brake system of claim 1, wherein the controller is configured to generate vibration simulating a kickback of the brake pedal in the motor in an ABS operation period.

3. The electronic brake system of claim 2, wherein the controller is configured to periodically repeat an ABS operation notification ON period for which the excitation current is supplied and an ABS operation notification OFF period for which the excitation current is not supplied, in the ABS operation period.

4. The electronic brake system of claim 1, wherein the controller is configured to supply the motor with an excitation current of a frequency which does not overlap an ABS operation frequency band.

5. The electronic brake system of claim 1, wherein the controller is configured to generate the vibration in the motor to generate vibration simulating a kickback of the brake pedal in an ABS operation period and generate an alarm sound due to shaking of a vehicle body.

6. The electronic brake system of claim 5, wherein the controller is configured to supply the motor with an excitation current having a plurality of frequencies different from each other.

7. The electronic brake system of claim 6, wherein the controller is configured to supply the motor with an excitation current in which a first frequency and a second frequency are continuously repeated, to generate an alarm sound where two sounds are repeated.

8. The electronic brake system of claim 1, wherein, during the ABS operation, the controller is configured to generate the excitation current by adding an excitation current command for generating the excitation current to a q-axis current command among the q-axis current command and a d-axis current command generated according to a target pressure.

9. The electronic brake system of claim 1, wherein the excitation current added to the current for controlling the speed of the motor is a dithering signal.

10. A control method of an electronic brake system comprising a master cylinder connected to a brake pedal; a hydraulic pressure supply device comprising a motor that generates a rotational force and a hydraulic piston movably accommodated in a pressure chamber, and configured to generate a hydraulic pressure by a movement of the hydraulic piston; a hydraulic control unit configured to control a flow of the hydraulic pressure transferred to a wheel cylinder from the hydraulic pressure supply device; a hydraulic block in which the master cylinder, the hydraulic pressure supply device and the hydraulic control unit are integrated; and a controller configured to control the motor and the hydraulic control unit, the control method comprising:

during an ABS operation, adding an excitation current for exciting the motor to a current for controlling a speed of the motor such that the motor is vibrated by the excitation current added to the current for controlling the speed of the motor to notify a driver of the ABS operation, and transmitting vibration, generated by the motor's being vibrated by the excitation current added to the current for controlling the speed of the motor, to the brake pedal through the hydraulic block in which the motor and the brake pedal are jointly mounted.

11. The control method of claim 10, wherein vibration simulating a kickback of the brake pedal is caused to be generated in the motor in an ABS operation period.

12. The control method of claim 11, wherein an ABS operation notification ON period for which the excitation current is supplied and an ABS operation notification OFF period for which the excitation current is not supplied are periodically repeated in the ABS operation period.

13. The control method of claim 10, wherein the vibration is caused to be generated in the motor to generate vibration simulating a kickback of the brake pedal in an ABS operation period and generate an alarm sound due to shaking of a vehicle body.

14. The control method of claim 13, wherein the motor is supplied with an excitation current having a plurality of frequencies different from each other.

15. The control method of claim 14, wherein the motor is supplied with an excitation current in which a first frequency and a second frequency are continuously repeated, to generate an alarm sound where two sounds are repeated.

16. The control method of claim 10, wherein the excitation current added to the current for controlling the speed of the motor is a dithering signal.

\* \* \* \* \*